United States Patent [19]
Huschke et al.

[11] Patent Number: 6,066,254
[45] Date of Patent: May 23, 2000

[54] FLUID FILTER ASSEMBLIES WITH INTEGRAL FLUID SEALS

[75] Inventors: Mark D. Huschke, Eden Prairie; Glen W. Peterson, Lake Elmo, both of Minn.

[73] Assignee: The Dow Chemical Company, Midland, Mich.

[21] Appl. No.: 09/014,488

[22] Filed: Jan. 28, 1998

[51] Int. Cl.$^7$ .............................. B01D 63/00; B01D 24/10
[52] U.S. Cl. .................... 210/282; 210/321.83; 210/450; 425/DIG. 47
[58] Field of Search ...................................... 210/232, 238, 210/282, 321.83, 450, 435, 494.1, 500.21, 497.01, 500.23, 497.1, 650, 652; 425/DIG. 47

[56] References Cited

U.S. PATENT DOCUMENTS

| | | |
|---|---|---|
| 3,237,775 | 3/1966 | Porter et al. . |
| 3,900,687 | 8/1975 | Meader, Jr. et al. . |
| 4,159,197 | 6/1979 | Schuler ................................... 210/462 |
| 4,211,543 | 7/1980 | Tokar ..................................... 210/484 |
| 4,349,363 | 9/1982 | Patel et al. . |
| 4,419,234 | 12/1983 | Miller ..................................... 210/232 |
| 4,959,150 | 9/1990 | Degen . |
| 5,131,688 | 7/1992 | Tricini ....................................... 285/53 |
| 5,316,798 | 5/1994 | Tittgemeyer ............................ 427/409 |
| 5,389,260 | 2/1995 | Hemp et al. . |
| 5,545,314 | 8/1996 | Parise et al. . |
| 5,556,541 | 9/1996 | Ruschke . |
| 5,587,066 | 12/1996 | Covington ............................. 210/450 |
| 5,723,047 | 3/1998 | Turnbull . |
| 5,738,673 | 4/1998 | Mills et al. . |

OTHER PUBLICATIONS

FILMTEC RO Element Brochure, FILMTEC Ad. No. FTC–94–119, Feb. 1994.

Information Disclosure Statement, mailed Oct. 10, 1996, in parent application, Ser. No. 08/728,810.

Declaration under 37 CFR 1.131, filed Jun. 25, 1997, in parent application, Ser. No. 08/728,810.

Von Hassell, A., "News in Urethane Equipment", *Plastics Technology*, May 1985, pp. 115–116.

*Spuehl Plastics Machines*, Publication of Spuehl AG, 1990.

Sprey, R. "Fabrication Methods for Solid Polyurethanes", *Rubber World*, 182, No. 1, Apr. 1980, pp. 32–35.

Coons, M.S., et al., "Rotational Casting of PU Covered Rolls", *Rubber World*, 210, No. 1, Apr. 1994, pp. 28–29, and 38.

Baumberger, B., et al., "Automatic Placement of In–Situ Formed Gaskets", Polymer Processing Machinery 4, Conference Proceedings, PRI Processing and Engineering Group, Bradford University, Jul. 3–4, 1991, pp. 12/1–12/10.

*Formed–in–Place–Products*, publication of H.B. Fuller Company, 1994.

*Introducing PURFORM™ Form–in–Place Materials to Your Operation*, publication of H.B. Fuller Company, 1995.

Dispensing System for Cured–in–Place Gasketig, *Adhesives Age*, 34, No. 3, Mar. 1991, p. 37.

*Primary Examiner*—David A. Simmons
*Assistant Examiner*—Fred Prince

[57] ABSTRACT

By making the fluid seal an integral part of either the filter element or the filter housing, the reliability of fluid filter assemblies is improved. In addition, the process for manufacturing filter assemblies and their individual components can be more easily automated.

9 Claims, 4 Drawing Sheets

FLUID FILTER ASSEMBLIES WITH INTEGRAL FLUID SEALS

FIELD OF THE INVENTION

The present invention concerns fluid filter assemblies having a filter element, a housing and a fluid seal. More particularly, the present invention concerns improved fluid filter assemblies in which the fluid seal is an integral part of either the filter element or the housing.

BACKGROUND OF THE INVENTION

Fluid filter assemblies are used in a wide variety of applications ranging in scale from the industrial processing of liquids and gases to the residential purification of drinking water. In general, such fluid filtration devices are comprised of a filter element, a housing and a fluid seal. The purpose of the fluid seal is to ensure that fluid entering the housing is directed through the filter assembly in a predetermined path, viz., through the filter element.

Traditionally, fluid seals are discrete parts, such as skirted gaskets, which engage the outer surface of the filter element and the inner surface of the housing. These seals are usually secured to the filter element with an adhesive tape, an adhesive or an interference or compression fit; see, for example, U.S. Pat. No. 5,389,260. The process for applying these seals tends to be very labor intensive and suffers from the associated ergonomic, quality and training implications. With the skirted gasket, fluid pressure between the skirt and the filter element tends to force the seal away from the element, thus threatening the integrity of the seal. This is particularly troublesome if the seal is secured to the filter element by taping. Furthermore, the typically narrow width of a skirted gasket leaves the integrity of the seal susceptible to disruption by surface imperfections and particulate contamination. Yet another disadvantage of the taped-on seal is the tendency to fold back when inserted into the housing, once again threatening the integrity of the seal and the overall performance of the filter assembly. When the integrity of the fluid seal is compromised, the feed stream can bypass the filter element and weaken the performance of the element. With reverse osmosis elements, such leakage results in ion rejection rates and permeate flow rates being less than optimal.

It would be desirable to have a fluid filter assembly whose production more easily lends itself to automation, particularly with respect to the incorporation of the fluid seal. It would also be desirable to have a fluid filter assembly in which the integrity of the fluid seal was more reliable and less susceptible to damage or deformation during installation and operation.

SUMMARY OF THE INVENTION

It has now been found that a filter assembly in which the fluid seal becomes an integral part of the filter element or the housing reduces the risk of the fluid seal folding back during installation and concomitantly increases the reliability of the seal. In reverse osmosis systems, because of the increased performance and reliability of the seal, ion rejection is significantly improved. Furthermore, by incorporating the fluid seal as an integral part of the filter element or the housing, the manufacturing process for the filter assembly and its constituent elements is more easily automated. Thus, the present invention concerns an improved fluid filter assembly of (a) a filter element having an outer surface, (b) a housing having an inner surface spaced from the outer surface of the filter element and (c) a seal between the outer surface of the filter element and the inner surface of the housing which directs fluid through the filter element, wherein the improvement comprises the seal being an integral part of the outer surface of the filter element or the inner surface of the housing. More particularly, the present invention concerns an improved fluid filter assembly of (a) a filter element, consisting of a cartridge filter of granular adsorbents or a hollow fiber or spiral wound membrane element, having an outer surface, (b) a housing having an inner surface spaced from the outer surface of the filter element and (c) a seal between the outer surface of the filter element and the inner surface of the housing which directs fluid through the filter element, wherein the improvement comprises the seal being a foamed material incorporated as an integral part of the outer surface of the filter element or the inner surface of the housing.

Another aspect of the invention is a filter element in which a fluid seal is incorporated as an integral part of its outer surface. Yet another aspect of the invention is a filter assembly housing in which a fluid seal is incorporated as an integral part of its inner surface. When the fluid seal is incorporated into the housing, a seal is not required on the filter element and the cost of replacing the element is reduced. The fluid seal may also be incorporated as an integral part of both the inner surface of the housing and the outer surface of the filter element. In this case, the entire filter assembly would be disposable.

DETAILED DESCRIPTION OF THE INVENTION

The fluid filter assemblies of the present invention are characterized as having a filter element, a housing for the filter element and a seal for directing the fluid through the filter element, the seal being incorporated as an integral part of either the outer surface of the filter element or the inner surface of the housing. By "the seal being incorporated as an integral part of either the outer surface of the filter element or the inner surface of the housing" is meant that the seal is bonded to or adheres to the surface of the filter element or the housing without the use of adhesive tape or a separate layer of adhesive, or without an interference or compression fitting. The filter element itself and the cavity of the housing into which it is inserted are usually cylindrical in configuration. While the cylindrical shape is preferred for the filter element and the cavity of the housing in which it resides, other shapes are possible, such as those of regular prisms, e.g., hexagonal prisms.

The fluid filter assemblies of the present invention can be used to treat a wide variety of fluids including both liquids and gases. Of particular interest is the treatment of water or brine, especially the purification of drinking water in residential applications, e.g., under-the-sink reverse osmosis units.

The filter elements, which comprise the functional element of the fluid filter assembly, may be of any conventional design including cartridge type filters used for granular adsorbents, i.e., charcoal or ion exchange or adsorbent resins, or hollow-fiber type or spiral-wound type elements used for membranes, i.e., ultrafiltration or reverse osmosis elements. The outer surface of filter elements is typically comprised of a plastic sheathing material, most often polyethylene (PE), polypropylene (PP) or polyvinyl chloride (PVC) in the form of a tape or film. In high pressure applications, fiber glass reinforced plastics like epoxy resins can be used to provide improved safety performance.

Figure 2:
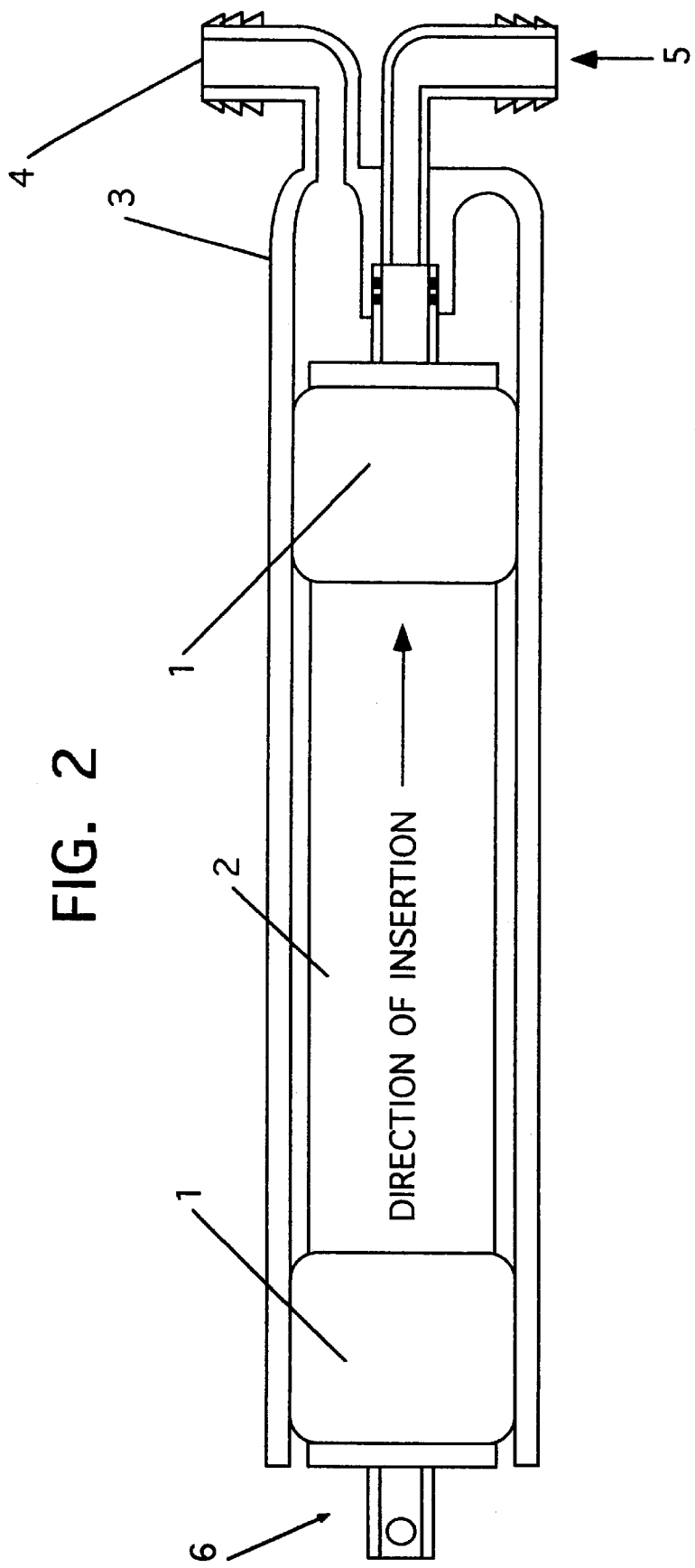
FIG. 2 illustrates a filter assembly in which a spiral wound filter element 2 with two integral fluid seals 1 has been inserted into a housing 3.
Figure 3:
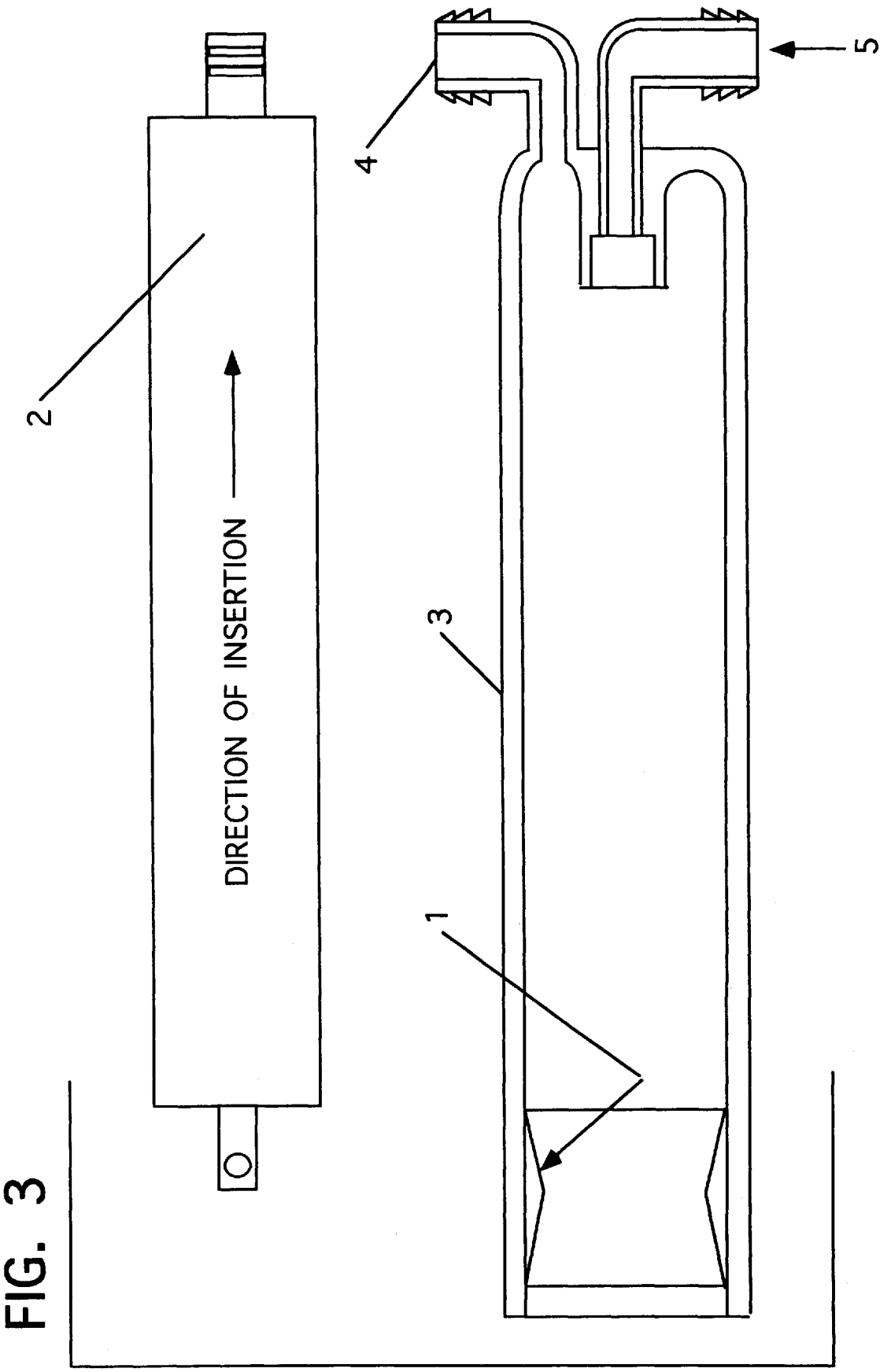
FIG. 3 depicts a housing 3 with an integral fluid seal 1 adjacent to the end of the housing that accepts the filter element 2.
Figure 4:
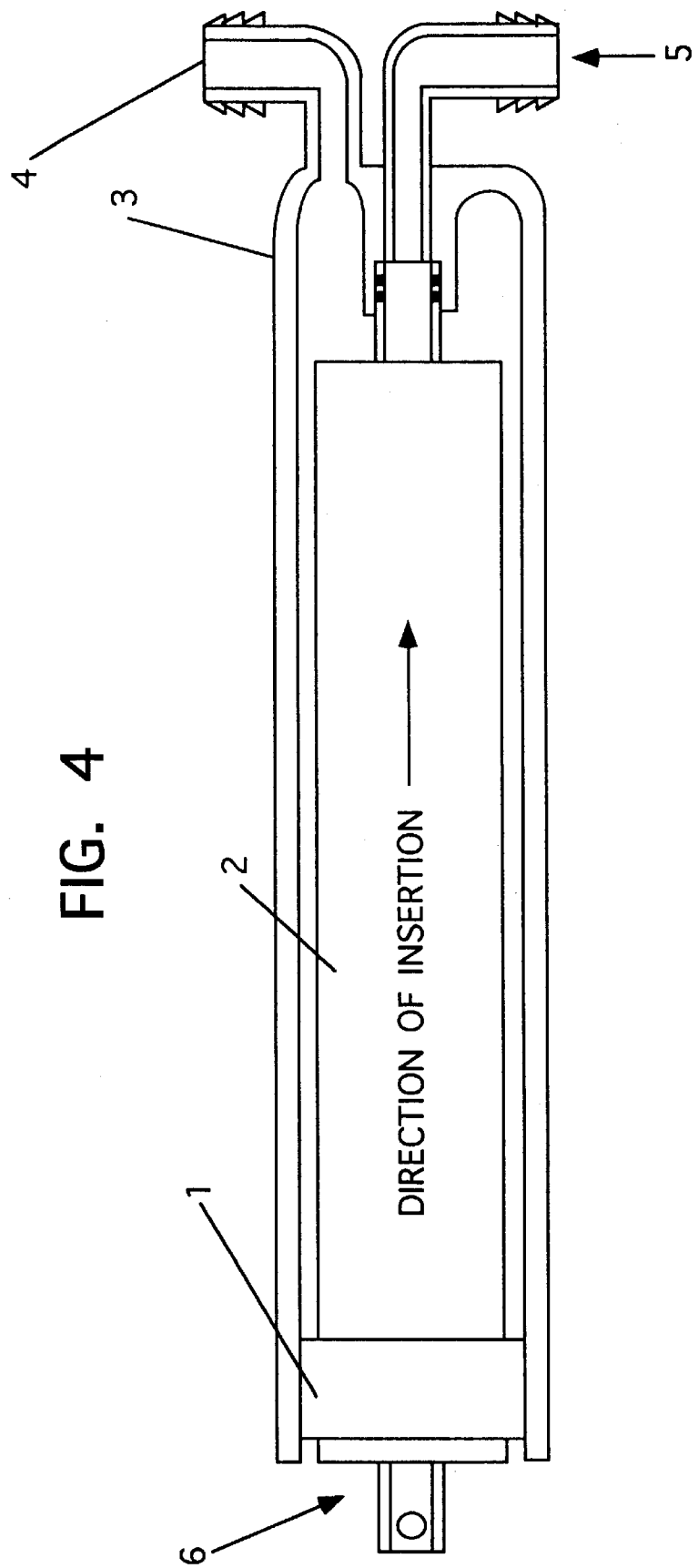
FIG. 4 shows a filter assembly in which the fluid seal 1 is an integral part of both the inner surface of the housing 3 and the outer surface of the filter element 2.

The housing into which the filter element is inserted has an inlet for the feed, an outlet for the filtrate or permeate and, in the case of a hollow fiber or spiral wound membrane element, an outlet for the discharge of the retentate. FIG. 2 illustrates, in part, a typical housing 3 for a spiral wound reverse osmosis filter element with a feed inlet 4, a permeate outlet 5 and a retentate outlet 6. The inner surface of the housing is typically comprised of a plastic material, most often acrylonitrile-butadiene-styrene (ABS), PVC, PE, PP, polysulfone, polystyrene (PS) or fiberglass reinforced epoxy resin, or a metal, such as aluminum or stainless steel.

The seal or gasket between the outer surface of the filter element and the inner surface of the housing serves the following functions: (a) separating the cavity containing a liquid to be filtered from the cavity containing the filtrate in the case of a cartridge filter or from the cavity containing the retentate in the case of a hollow fiber or spiral wound membrane element; and (b) holding the filter element in place in the presence of a pressure differential. The gist of the present invention is the incorporation of the seal as an integral part of either the outer surface of the filter element or the inner surface of the housing.

To accomplish the above functions, the material from which the seal is fabricated must remain flexible and resilient. To become an integral part of the filter element or the housing, the seal material must be one which can be easily applied and affixed to the surface of the filter element or housing without the need of an adhesive tape, an adhesive or an interference or compression fitting. Suitable seal materials can be either thermoplastics, i.e., polymers which soften when exposed to heat and return to their original condition when cooled to room temperature, or thermosets, i.e., polymers which solidify irreversibly when heated. Thermoplastics and thermosets such as ethylene-propylene diene monomer (EPDM), neoprene, buna rubbers, ethylene-vinyl acetate (EVA), PE and PP are suitable seal materials and can be molded directly onto the surface of either the filter element or the housing. Even more preferred are polyurethane and silicone materials which can be applied with or without a mold and can be cured at relatively low temperatures, for example, H. B. Fuller's PURFORM™ foamed-in-place products.

Some of the seal materials may be applied as foams, which is often preferred. Air or an inert gas such as nitrogen or carbon dioxide can be introduced with the seal material to produce a foamed seal. Alternatively, the gas can be chemically generated in situ, e.g., during the production of polyurethane, carbon dioxide is generated by adding water to the isocyanate.

The seal material, particularly polyurethane, can be integrally attached or affixed to the filter element or the housing by means of injection molding or by means of spin or rotational casting, i.e., the controlled application of the seal material to a rotating filter element or housing. Both processes are well known in the art and can be conveniently automated. See, for example, the following references: B. Baumberger et al., "Automatic Placement of In-Situ Foamed Gaskets", Polymer Processing Machinery 4, Conference Proceedings, PRI Processing and Engineering Group, Bradford University, Jul. 3–4, 1991, p 12/1–12/10; *Spuehl Plastics Machines*, publication of Spuehl AG, 1990; A. Von Hassell, "Urethane Equipment", *Plastics Technology*, May, 1985, p 115–6; M. S. Coons et al., "Rotational Casting of PU Covered Rolls", *Rubber World*, 210, No. 1, April, 1994, p 28; R. Sprey, "Fabrication Methods for Solid Polyurethanes", *Rubber World*, 182, No. 1, April, 1980, p 32; *Foamed-in-Place Products*, publication of H. B. Fuller Company, 1994; and *Introducing PURFORM™ Foam-in-Place Materials to Your Operation*, publication of H. B. Fuller Company, 1995.

With injection molding, a hollow mold or molds of appropriate configuration are clamped or secured to either a filter element or a housing and the thermoplastic or thermoset seal material is injected into the mold and cured. A material that promotes release of the mold may optionally be applied to the surface of the mold. After curing is complete, the molds are removed. With the injection molding technique, the fluid seal can be incorporated as an integral part of both the housing and the filter element by orienting the element in the housing and using the inner surface of the housing and the outer surface of the element as part of the mold.

With the controlled application method, the filter element or housing is rotated while the seal material is applied through a nozzle. The dimensions of the seal are controlled by such factors as feed rate of the seal material, rotation rate of the filter element or housing, angle of the nozzle and the temperature and rate of cure. Such factors are dependent upon the composition of the particular seal material employed and can be ascertained by routine experimentation.

In some instances, in order for the fluid seal to become an integral part of the filter element or the housing, it may be necessary to pretreat the outer surface of the filter element or the inner surface of the housing to remove, for example, a peel-off coat. Such a pretreatment may include but is not limited to heat treatment, corona, abrasion or acid etching.

Figure 1:
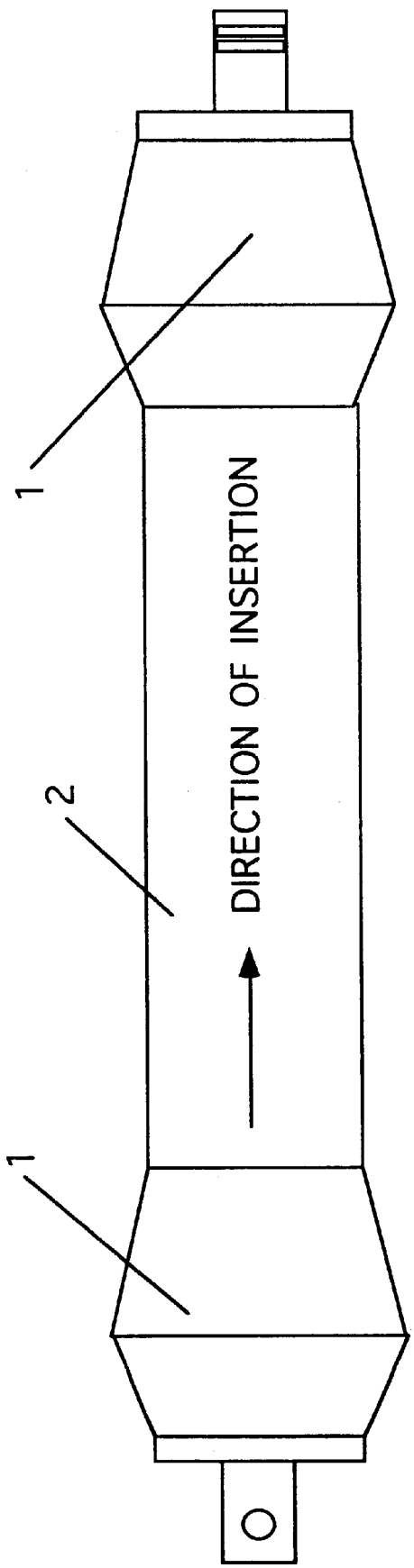
FIG. 1 depicts a spiral wound filter element 2 with two integral fluid seals 1 located near the ends of the outer surface.

The exact configuration of the integral seal is not critical and can vary widely from a single band of a width of about 0.1 to about 6 inches to multiple bands of a width of about 0.1 to about 3.0 inches. Multiple bands of a width of about 0.5 to about 2.0 inches are preferred. The height of the integral seal is determined by the clearance between the outer surface of the filter element and the inner surface of the housing and should provide for a snug and reliable fit of the filter element in the housing. The seals can be beveled to facilitate the insertion and the extraction of the filter element into or out of the housing. Placement of two integral seals near the termini of the filter element or the housing facilitates stability of the filter assembly. FIGS. 1 and 2 illustrate a spiral wound filter element 2 with two integral fluid seals 1 located near the termini of the element and a filter assembly in which the filter element 1 has been inserted into a housing 3, respectively.

In a typical example of the spin casting or rotational casting method, the filter element or housing is rotated at an experimentally determined speed while the components of the seal material and, if desired, air, an inert gas or precursors which will chemically generate an inert gas are fed into a computer controlled nozzle which applies the seal material to the surface of the rotating element or housing.

In a typical example of the injection molding method, a mold is clamped to the filter element or housing and the components of the seal material and, if desired, air, an inert gas or precursors which will chemically generate an inert gas are injected into the mold. After curing, the mold is removed.

The following examples further illustrate the invention.

EXAMPLE 1

Rotational Casting

A FILMTEC™ TW30-1812-36 spiral wound reverse osmosis filter element, which has a polypropylene outer surface and which has been wound and finished to the point where the addition of the brine seal is the only step remaining, is placed in a fixture that rotates the element about the axis of the product water tube. A polyol component (a), containing ethylene glycol, carbon black, silica and enough water to produce sufficient carbon dioxide in situ to provide a foamed product upon reaction with the isocyanates, and an isocyanate component (b), containing methylene diphenyl isocyanate (MDI), are metered continuously at ambient temperature with high precision into a mixing head and nozzle at a stoichiometric ratio of MDI to the total of ethylene glycol and water and at a rate designed to dispense a predetermined distribution of foamed-in-place polyurethane material on the surface of the element. The element is rotated at a predetermined speed while a robot dispenses the foamed-in-place polyurethane material from the nozzle to the surface of the rotating element to which it adheres. The nozzle is moved axially along the element while the material is dispensing to achieve a predetermined distribution of foamed sealant. The amount of material at any point of the surface of the element is a function of the relative motion of the rotating element and the dispenser nozzle and the flow rate of the foamed polyurethane material. After the appropriate amount of material has been dispensed in the desired pattern, the element is removed from the rotating fixture and allowed to cure at ambient temperature.

EXAMPLE 2

Injection Molding

The same materials and elements as used in Example 1 are used in the present example. However, rather than applying the seal by spin or rotational casting, the foamed polyurethane material is applied by injection molding. The element is placed in an aluminum mold coated with Teflon™ polymer that is sized for the element and contains a void space defined by the contour of the filter element and the integral brine seal.

The foamed polyurethane material is injected into the mold using the same robotic assembly of Example 1 which engages the dispensing nozzle to a port in the mold which allows the material to be introduced into the mold once it is closed. After the brine seal material has cured, the element with its molded on brine seal is removed from the mold.

EXAMPLE 3

Test Method for Spiral Wound Reverse Osmosis Elements

Dry filter elements of 1.8 inch nominal diameter having standard tape-on brine seals or having foamed-in-place brine seals as in Example 1 are inserted into 2 inch inside diameter test vessels of a standard reverse osmosis system. The system is then operated under standard test conditions of approximately 50 pounds per square inch gauge pressure, 15 percent recovery and 25° C. for 30 minutes with feed water containing about 485 parts per million sodium bicarbonate. At the end of 30 minutes, a sample of the permeate is withdrawn and the conductivity (micromhos) and volume flow rate are determined. Permeate flow (gallons per day) and rejection (%) are calculated and normalized to allow comparisons of element performance. The results are summarized in Table I.

TABLE I

COMPARISON BETWEEN FOAM-IN-PLACE (FIP) AND TAPE-ON (TAPE) BRINSEALS

| | Conductivity ($\mu$mho) | | Rejection (%) | | Flow (gal/day) | |
|---|---|---|---|---|---|---|
| | TAPE | FIP | TAPE | FIP | TAPE | FIP |
| | 19.8 | 15.7 | 96.4 | 97.2 | 54.1 | 50.6 |
| | 20.6 | 18.2 | 96.3 | 96.7 | 54.4 | 54.3 |
| | 21.6 | 14.8 | 96.1 | 97.3 | 53.4 | 52.4 |
| | 21.5 | 15.5 | 96.1 | 97.2 | 53.4 | 52.4 |
| | 19.8 | 16 | 96.4 | 97.1 | 53.2 | 53.3 |
| | 18.5 | 16.3 | 96.6 | 97.0 | 54.5 | 54.8 |
| | 20.6 | 16.2 | 96.3 | 97.1 | 54.1 | 53.9 |
| | 20.4 | 15.5 | 96.3 | 97.2 | 54.9 | 53.9 |
| | 18.2 | 16.5 | 96.7 | 97.0 | 53.7 | 54.7 |
| | 18.5 | 16 | 96.6 | 97.1 | 53.4 | 52.8 |
| | 16.5 | 16.6 | 97.0 | 97.0 | 51.7 | 53.4 |
| | 22.7 | 16.6 | 95.9 | 97.0 | 54.5 | 55 |
| | 19.3 | 16 | 96.5 | 97.1 | 55.3 | 54.4 |
| | 19.8 | 17.1 | 96.4 | 96.9 | 54.7 | 55.2 |
| | 18.8 | 14.9 | 96.6 | 97.3 | 54.6 | 54.4 |
| | | 16.7 | | 97.0 | | 54.3 |
| | | 16.2 | | 97.1 | | 55 |
| | | 18.2 | | 96.7 | | 55 |
| | | 17.2 | | 96.9 | | 55.7 |
| | | 17.8 | | 96.8 | | 55.2 |
| AVERAGE: | 19.77 | 16.40 | 96.40 | 97.02 | 54.06 | 54.03 |
| St dev: | 1.56 | 0.95 | 0.29 | 0.18 | 0.88 | 1.26 |

What is claimed is:

1. An improved fluid filter assembly of (a) a filter element, consisting of a cartridge filter of granular adsorbents or a hollow fiber or spiral wound membrane element, having an outer surface, (b) a housing having an inner surface spaced from the outer surface of the filter element and (c) a seal between the outer surface of the filter element and the inner surface of the housing which directs fluid through the filter element, wherein the improvement comprises the seal being a foamed material incorporated as an integral part of the outer surface of the filter element or the inner surface of the housing.

2. The fluid filter assembly of claim 1 in which the filter element is a spiral wound membrane element.

3. The fluid filter assembly of claim 1 in which the fluid seal is comprised of a foamed polyurethane material.

4. The fluid filter assembly of claim 1 in which the fluid seal is an integral part of the outer surface of the filter element and the inner surface of the housing.

5. The filter element (a) of claim 1 in which the fluid seal is incorporated as an integral part of its outer surface.

6. The filter element of claim 5 in which the filter element is a spiral wound membrane element.

7. The filter element of claim 5 in which the fluid seal is comprised of a foamed polyurethane material.

8. The filter assembly housing (b) of claim 1 in which a fluid seal is incorporated as an integral part of its inner surface.

9. The filter assembly housing of claim 8 in which the fluid seal is comprised of a foamed polyurethane material.

* * * * *

UNITED STATES PATENT AND TRADEMARK OFFICE
CERTIFICATE OF CORRECTION

PATENT NO. : 6,066,254
DATED : May 23, 2000
INVENTOR(S) : Huschke et al.

Page 1 of 1

It is certified that error appears in the above-identified patent and that said Letters Patent is hereby corrected as shown below:

Column 1,
"This application is a continuation of prior application no. 08/728,810 filed October 10, 1996" needs to be inserted into the patent (6,066,254) just below the title Signed and Sealed this Twenty-fifth Day of September, 2001

Attest:

*Nicholas P. Godici*

NICHOLAS P. GODICI
*Attesting Officer*   *Acting Director of the United States Patent and Trademark Office*